(No Model.)

H. J. HURD.
TETHER.

No. 342,300. Patented May 18, 1886.

Witnesses.

Harvey J. Hurd.
Inventor.
By Atty.

UNITED STATES PATENT OFFICE.

HARVEY J. HURD, OF NORTHFORD, CONNECTICUT.

TETHER.

SPECIFICATION forming part of Letters Patent No. 342,300, dated May 18, 1886.

Application filed March 29, 1886. Serial No. 196,914. (No model.)

*To all whom it may concern:*

Be it known that I, HARVEY J. HURD, of Northford, in the county of New Haven and State of Connecticut, have invented a new Improvement in Tethers; and I do hereby declare the following, when taken in connection with accompanying drawings and the letters of reference marked thereon, to be a full, clear, and exact description of the same, and which said drawings constitute part of this specification, and represent in—

Figure 1:
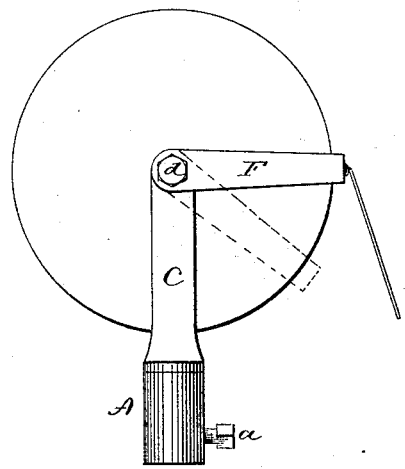
Figure 2:
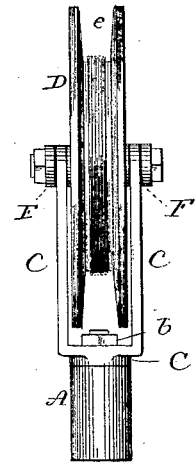
Figure 3:
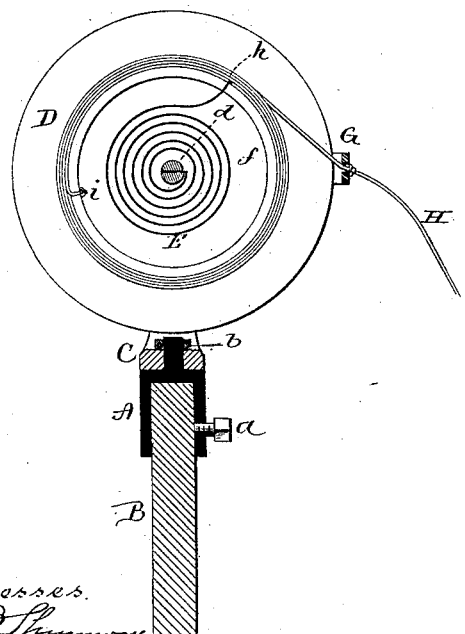
Figure 4:
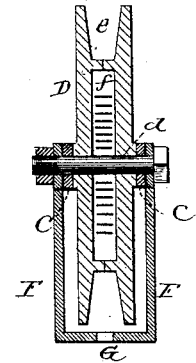

Figure 1, a side view; Fig. 2, an edge view; Fig. 3, a vertical central section at right angles to the axis of the drum; Fig. 4, a horizontal section parallel with the axis of the drum.

This invention relates to a device for tethering animals, and is of the class in which the attaching-cord is arranged upon a spring-drum, and so that as the animal approaches the center or drum the cord will be wound, or the spring will permit the animal to move from the center or drum, the object of the invention being a simple and cheap construction, which may be readily attached to a staff made fast in the earth; and it consists in the construction, as hereinafter described, and particularly recited in the claims.

A is a socket, which is adapted to be set upon the upper end of a staff, B, and secured by a set-screw, *a*, or otherwise. The staff intended to be used is a common crow-bar, and which may be readily set firmly into the ground or removed, as the location is desired to be changed. On the socket A a supporting-frame, C, is pivoted upon a vertical axis, *b*. The frame consists of two arms extending upward, and between which the drum D is hung upon an axis, *d*. The axis is fixed in the frame, the drum free to revolve thereon. In the periphery of the drum is an annular groove, *e*, adapted to receive the guard by which the animal is to be tethered. Within the drum is a spring-chamber, *f*, and in this chamber a coiled spring, E, is arranged, one end made fast to the axis *d*, the other to the drum, as at *h*, and so that as the drum is revolved in one direction the spring will be wound, and the reaction of the spring will turn the drum in the opposite direction. Hung upon the axis *d* is an arm, F, preferably one upon each side, which extends radially outward, and connected across outside the pulley, as at G. These arms I construct so as to turn upon the pivot to swing up or down. Through the connection G an opening is made, through which the cord H runs as a guide in being wound upon or drawn from the drum, the inner end of the cord attached to the drum, as at *i*, as seen in Fig. 3. The frame C, being pivoted to the socket A, works thereon as upon a swivel, and so as to turn in any direction upon a vertical axis. The bar or staff B is secured in the ground, and then the socket A made fast to its upper end. The animal is secured to the free end of the cord H in the usual manner, and as it moves from the staff the spring yields to permit the cord to unwind from the drum, but as the animal approaches the staff the reaction of the spring rewinds the cord upon the drum. As the animal moves around the staff the drum turns accordingly, being forced so to do by the action of the cords through the arms F. The arms F, being pivoted to the axis, are permitted to turn downward as the animal approaches the staff, as indicated in broken lines, Fig. 1, or rise as the animal recedes therefrom, so that the cross-piece or guide G will always stand in a direct line from the drum to the animal, and thereby permit the free working of the cord. The arms F may be made stationary upon the axis without the circumferential movement.

The article thus constructed is easily applied, not liable to get out of order, and extremely cheap.

I am aware that tethers have been constructed to automatically wind the cord or rope thereon, either by a weight or spring, and therefore do not wish to be understood as broadly claiming such a tether.

I claim—

1. The combination of the socket A, constructed to be attached to the end of a staff, the frame C, swiveled to said socket, fixed axis in said frame, drum D, arranged on said axis, constructed with a chamber, *f*, the coiled spring E within said chamber, one end fixed to said axis, the other to the drum, arm F, extending from the frame outward, carrying the guide G at the periphery of the drum, and a cord, one end secured to said drum and extending therefrom through said guide, substantially as described.

2. The combination of the socket A, constructed to be attached to the end of a staff, the frame C, swiveled to said socket, fixed axis in said frame, drum D, arranged on said axis, constructed with a chamber, $f$, the coiled spring E within said chamber, one end fixed to said axis, the other to the drum, and an arm, F, hung upon the axis $d$, and so as to turn thereon, said arm extending outward and carrying the guide G at the periphery of the drum, and a cord, one end secured to said drum and extending therefrom through said guide, substantially as described.

HARVEY J. HURD.

Witnesses:
EDWARD SMITH,
G. A. SMITH.